United States Patent
Mills

[15] 3,702,626
[45] Nov. 14, 1972

[54] TIMBER MILL
[72] Inventor: Druid L. Mills, 96 Ella Taylor Rd., Yorktown, Va. 23490
[22] Filed: Nov. 6, 1970
[21] Appl. No.: 87,639

Related U.S. Application Data

[63] Continuation of Ser. No. 726,159, May 2, 1968, abandoned.

[52] U.S. Cl. ............................... 143/32 P, 143/46 F
[51] Int. Cl. ............................................. B27b 17/02
[58] Field of Search ........ 143/32 R, 32 P, 46 R, 46 F, 143/55; 83/363, 364, 372

[56] References Cited

UNITED STATES PATENTS

| | | | |
|---|---|---|---|
| 932,217 | 8/1909 | Wilkinson | 143/46 F |
| 1,262,943 | 4/1918 | Gustafson | 143/46 F |
| 2,291,982 | 8/1942 | Overacker et al. | 143/168 C |
| 2,410,887 | 11/1946 | Locke | 143/46 F |
| 2,876,815 | 3/1959 | Rodgers | 143/46 F |
| 2,889,858 | 6/1959 | Roberts | 143/46 F |
| 3,457,971 | 7/1969 | Maradyn | 143/46 R |

FOREIGN PATENTS OR APPLICATIONS

| | | | |
|---|---|---|---|
| 722,125 | 1/1955 | Great Britain | 143/46 R |

*Primary Examiner*—Donald R. Schran
*Attorney*—Shoemaker & Mattare

[57] ABSTRACT

An adjustable in-feed conveyor carries logs to a positioning feed means. A sawyer selects the desired log length and the positioning feed means moves the log to the proper position adjacent a saw. Clamping means disposed adjacent the saw is adapted to securely hold a log in place while it is being cut. The positioning feed means then moves the log away from the saw to an unloading station including spaced movable unloading portions adapted to engage logs and lift them off of the feed means and onto a truck and the like. The apparatus is mounted on a mobile trailer means.

35 Claims, 10 Drawing Figures

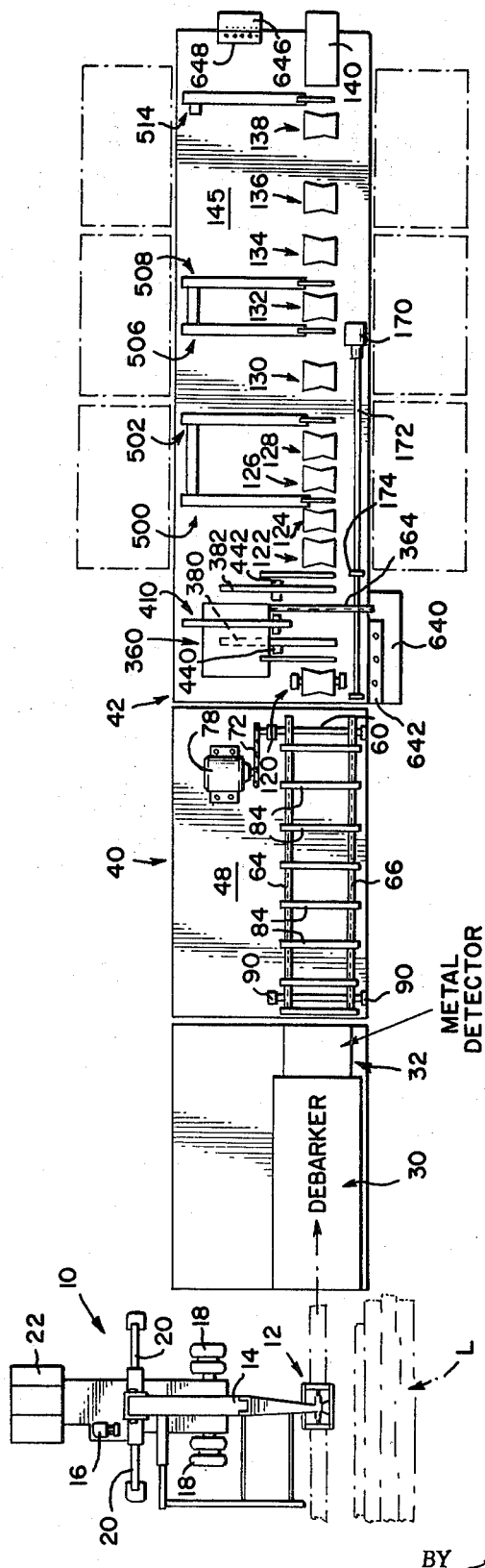

Fig. 2a.

INVENTOR
DRUID L. MILLS

BY Shoemaker and Mattare
ATTORNEYS

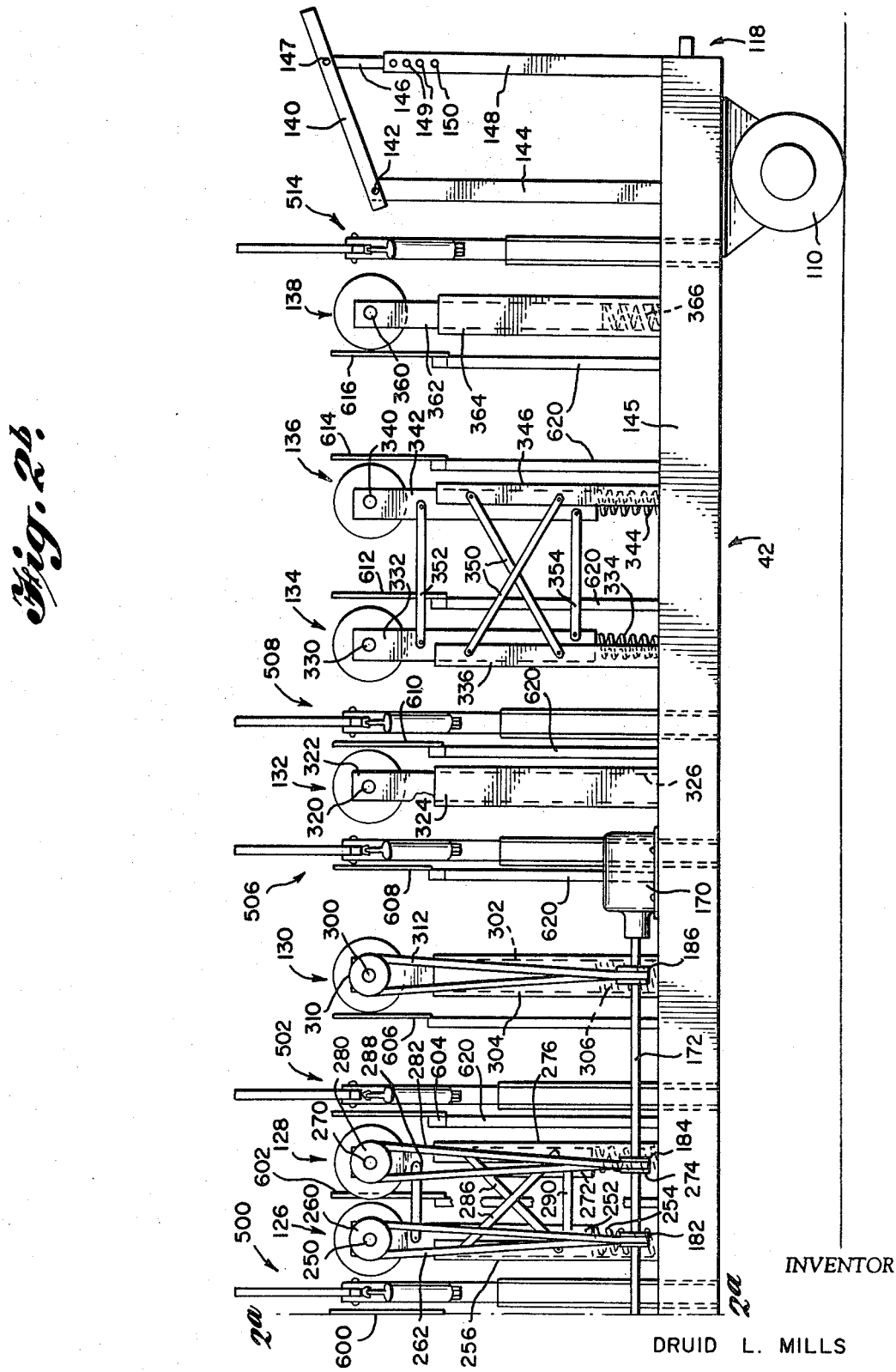

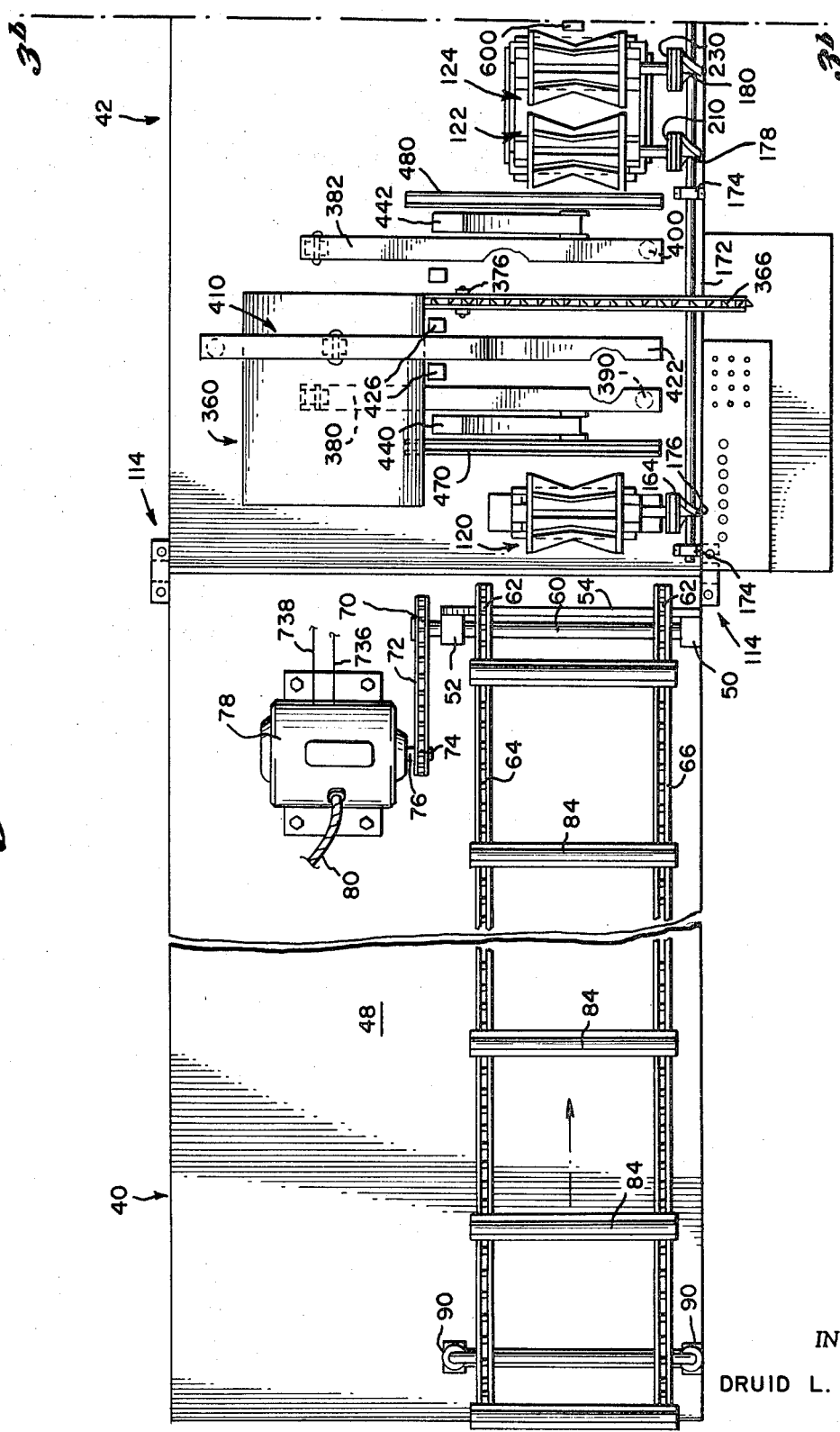

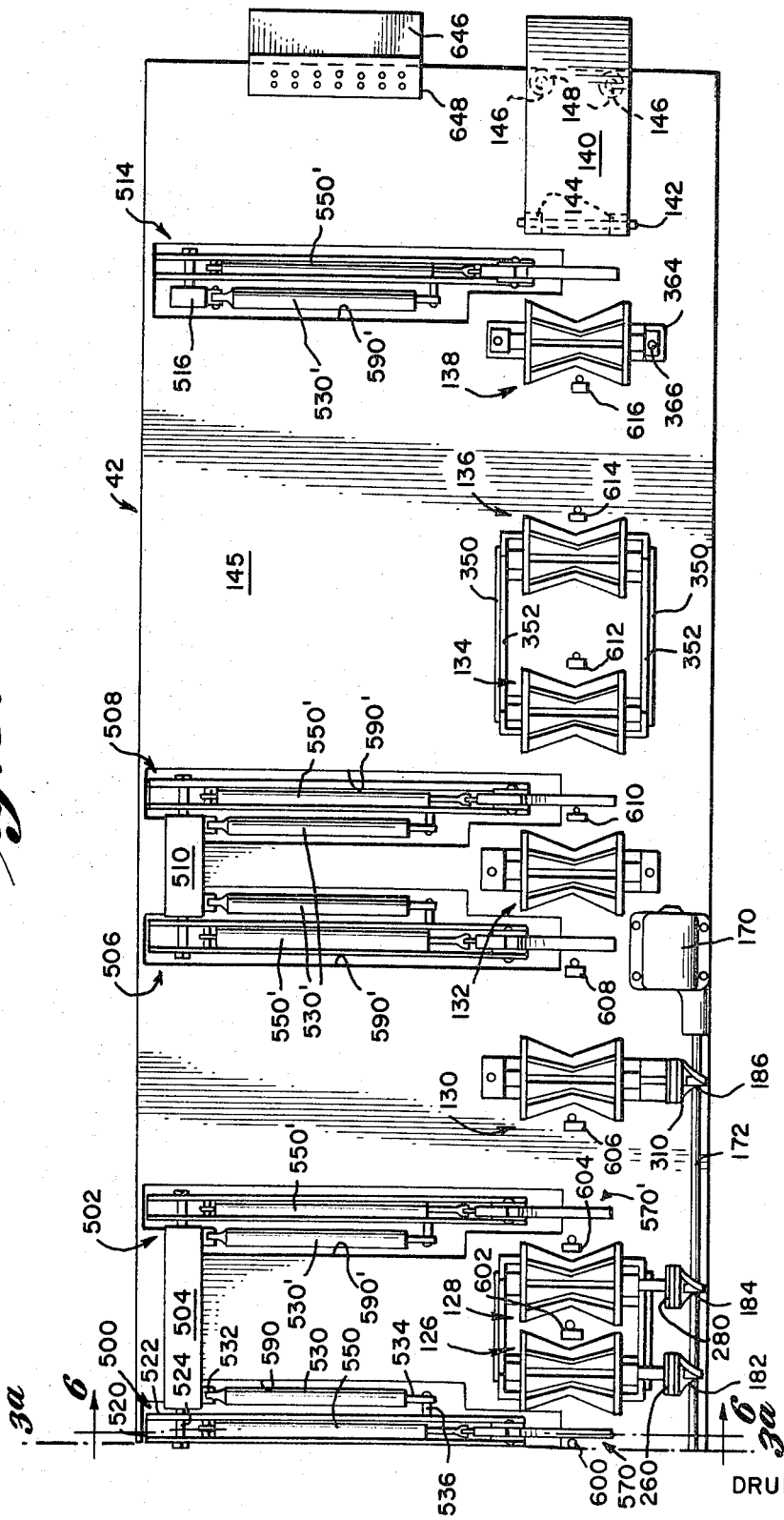

INVENTOR
DRUID L. MILLS

BY Shoemaker and Mattare
ATTORNEYS

INVENTOR
DRUID L. MILLS

BY Shoemaker and Mattaro
ATTORNEYS

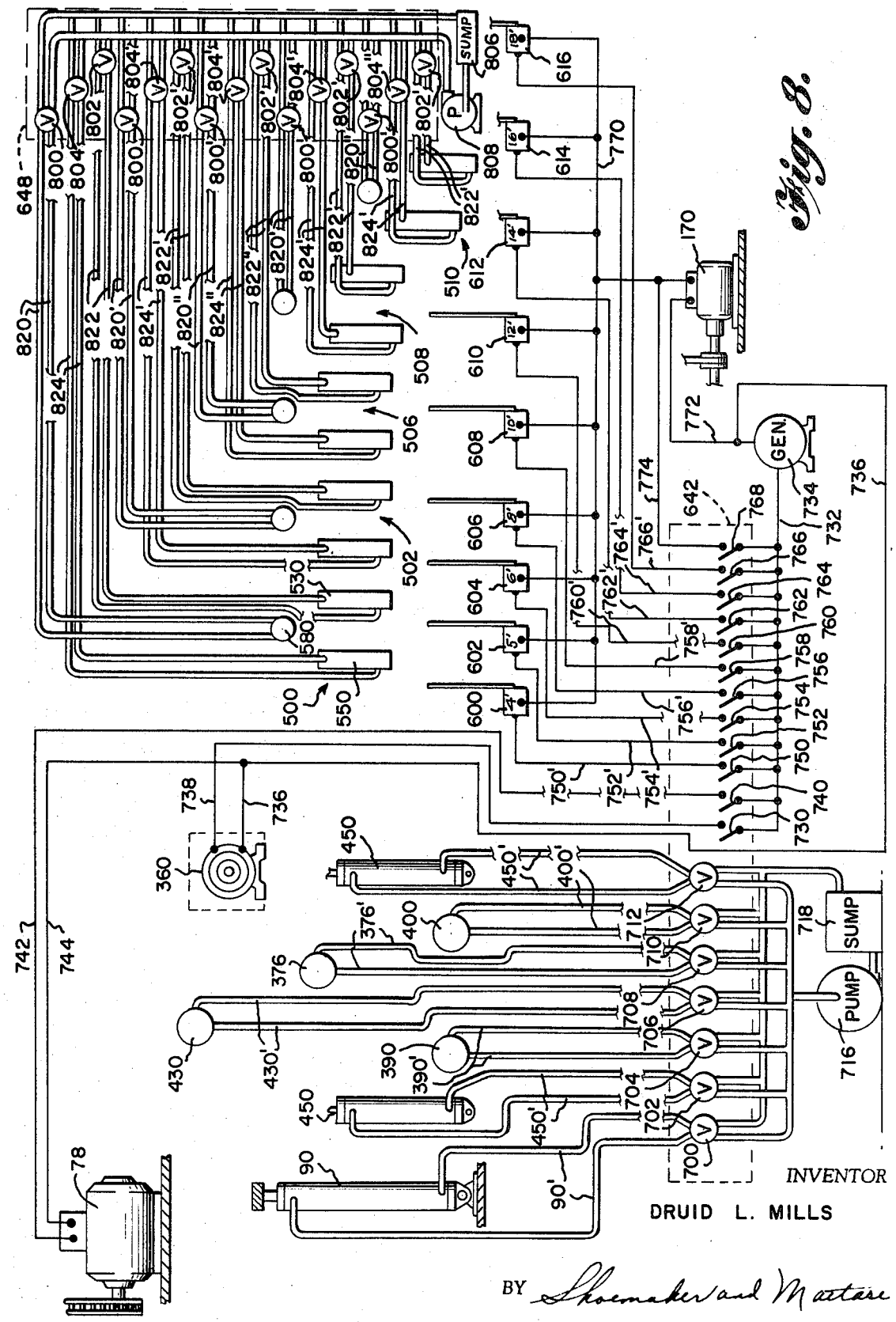

TIMBER MILL

This patent is a continuation of U.S. application Ser. No. 726,159, filed May 2, 1968 and now abandoned.

BACKGROUND OF THE INVENTION

The present invention relates to a self-contained timber mill of the type mounted on a mobile vehicle so that it can be readily moved to any suitable location where it is desired to harvest logs from the woods.

In the past, it has been a common practice to cut down trees, and then the entire trees are loaded onto long trailers in the woods and carried to a sawmill at a fixed installation. The tree is then unloaded and sawed to length. Those logs which are undesired at a mill such as veneer or pulpwood must then be re-loaded onto trucks and carried to another mill.

The above type of operation is obviously inefficient, and efforts have been made to provide mobile apparatus sometimes termed "Log Slashers" in the form of a mobile vehicle which can be driven to the desired cite. Such log slashers in the prior art are suited for cutting pulpwood only and cut all logs to one length. No sawyer is required or useful in operation of this type of apparatus wherein all the logs are automatically cut to the same length.

This type of prior art apparatus is so arranged that when the logs are cut into pulpwood length, they are dropped into a basket and when a bundle of such logs have been cut, a grapple which is employed for placing the log in place on the apparatus is then employed for picking up the bundle of pulpwood logs to place them on a truck and the like.

The principal disadvantage of employing apparatus as described hereinabove is that when all logs are cut to a single length, a great deal of lumber may be wasted, and this is certainly not the most efficient way to cut logs.

In the prior art, it has been a common practice to cut logs in the field by the use of manually operated power saws. The logs are measured by eye or by a stick, and the length thereof is only very roughly estimated. It is normally desirable to cut logs into certain predetermined lengths in accordance with the type of wood involved. For example, pulpwood is usually cut into 5- foot lengths, while veneer may be cut in lengths of 4 ft., 5 ft. and 6 ft. and the like, whereas saw logs may be cut into lengths of 8 ft., 10 ft., 12 ft., 14 ft., 16 ft. or 18 ft., or other special lengths. When these lengths are only roughly estimated, the logs are usually cut a little longer than necessary so that a considerable amount of lumber is lost in the final product.

In prior art cutting procedures, as employed in the field, the ends of the logs are rarely cut square, thereby requiring considerable trimming later on. The principal disadvantage of most log cutting operations is the fact that they are not cut properly so as to use lumber to the best advantage so as to take into consideration the taper of the logs and the crooks therein. In order to most efficiently cut logs, the services of a sawyer are required. Since a sawyer is a relatively skilled person, his services are not generally employed in the field because of the cost consideration.

In present-day logging operations, the cut logs are often moved around quite a bit in the woods, and all of this movement represents lost time and requires extra equipment.

Another problem involved in loading logs in the field is the fact that it is difficult to align the logs thereby making it difficult to efficiently load the logs on a truck. Furthermore, when it is desired to measure a log, it must first be unloaded from a truck or the like in prior art procedures.

SUMMARY OF THE INVENTION

The present invention provides a mobile timber mill which can be taken directly to the location where the logs are cut. Accordingly, it is not necessary to load an entire tree onto a trailer and then transport it to a sawmill.

A particularly important feature of the present invention is the provision of a feed means the operation of which can be selectively and accurately controlled so as to control the length of the logs cut by the machine. This control means is in the form of a remote control system which may be readily operated by a sawyer so positioned relative to the machine that he can readily observe the logs as they are being fed into the machine. Accordingly, a skilled sawyer can most effectively cut the logs taking into consideration the taper of the logs as well as the crooks therein. Maximum efficiency of log cutting is thereby obtained with the arrangement of the present invention.

It is not necessary to measure the logs by any rough estimating procedure, but rather an effective automatic measuring system is provided in the present invention which ensures that the logs will be cut to the desired length. In this manner, no lumber is lost by cutting the logs to an excessive length.

The apparatus of the present invention enables logs to be cut in a very quick and efficient manner, and considerably increases the speed of cutting as compared to the utilization of manually operated power saws as conventionally employed in the field.

The apparatus of the present invention is adapted to cut square ends on the logs to thereby eliminate necessity for trimming the logs at a later time.

Due to the efficiency of operation of the apparatus of the present invention, a skilled sawyer's services can be utilized so as to obtain the most effective possible cutting of logs.

The mobile timber mill of the present invention reduces the necessity for moving cut logs about to a minimum, the logs being shifted from the cut position onto the feed means of the timber mill, and then subsequently effectively unloaded from the apparatus onto a truck or the like for transport to the ultimate destination.

The unloading procedure can be effectively carried out in the present invention so that the butt ends of the logs are aligned with one another whereby more efficient loading of the truck is obtained and a neater load is possible.

The length of the log to be cut is very accurately determined by the apparatus of the present invention, and it is not necessary to unload a log in order to measure the length thereof.

BRIEF DESCRIPTION OF THE DRAWINGS

FIG. 1 is a top somewhat schematic view of the timber mill of the present invention in association with other structure for carrying out a log cutting operation;

FIGS. 2a and 2b disclose two halves of the mobile timber mill as seen in elevation, it being understood that the lines 2b and 2a of FIGS. 2a and 2b respectively are adapted to be superimposed upon one another to provide the complete view, the sawyer's platform and panel being removed from FIG. 2a for the sake of clarity;

FIGS. 3a and 3b are top views of the structure shown in FIGS. 2a and 2b respectively, FIGS. 3a and 3b being adapted to be superimposed along the lines 3b and 3a of FIGS. 3a and 3b respectively to provide the complete view;

FIG. 8 is a schematic illustration of the remote control hydraulic and electrical systems for remotely operating various portions of the apparatus of the present invention.

DESCRIPTION OF THE PREFERRED EMBODIMENT

Figure 4:
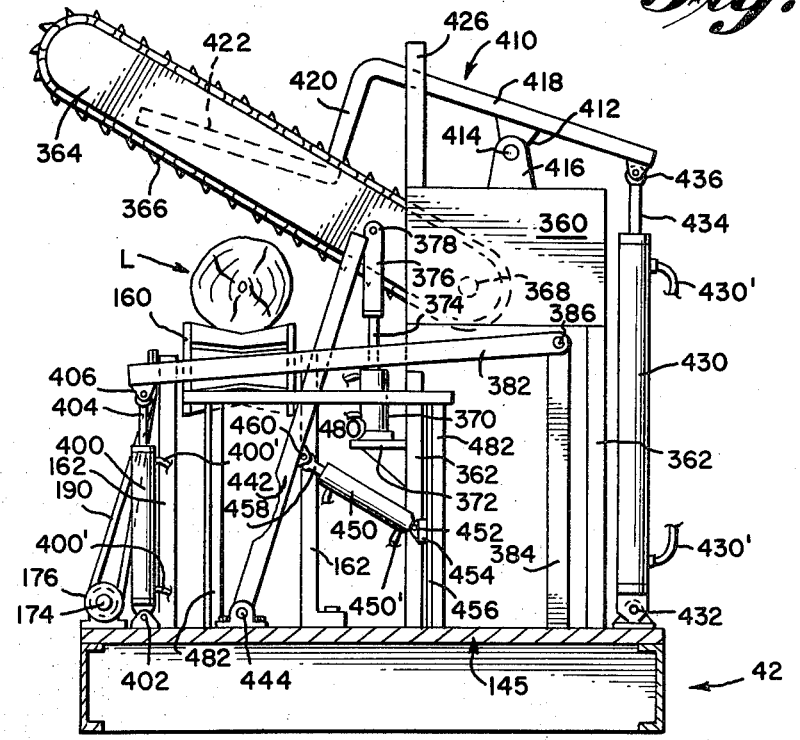
FIG. 4 is a sectional view taken substantially along line 4—4 of FIG. 2a looking in the direction of the arrows.

Referring now to the drawings wherein like reference characters designate corresponding parts throughout the several views, FIG. 1 illustrates in a somewhat schematic manner the over-all arrangement which may be employed for processing logs in the field. As seen in this figure, a suitable mobile vehicle indicated generally by reference numeral 10 is provided, this particular vehicle forming no part of the present invention and being of known construction. The vehicle includes a grapple means 12 mounted at the end of an extensible boom portion 14 which is operated by an operator seated in the seat 16 mounted at an upper portion of the vehicle. The vehicle is supported by road wheels 18, and conventional outriggers 20 are provided for bracing and steadying the vehicle when in use. A cab 22 is provided for operating the vehicle in over-the-road transit.

Mobile vehicle 10 is illustrated solely as a suitable means for lifting a log from a group of logs indicated by reference character L onto the apparatus employed for processing the logs. Any other suitable handling means may be employed in place of the mobile vehicle 10 as will be apparent to one skilled in the art.

The grapple 12 is adapted to move a log onto a conventional debarker mechanism indicated generally by reference numeral 30 which is adapted to remove the bark from a log in a well known manner. The log travels along the debarker and thence over a metal detector mechanism 32 which is adapted to detect the presence of nails or other metal objects which might be harmful to the saw of the timber mill. If any undesired metallic objects are detected, paint is sprayed at the point where metal is hidden, so that the sawyer can cut out and discard this section of log.

The timber mill of the present invention includes a pair of mobile vehicles 40 and 42 which are trailers adapted to be towed by a suitable tractor mechanism. It is of course apparent that the chassis of one of these mobile vehicles could be extended to include a cab and drive mechanism so that the mobile vehicles could incorporate their own driving gear to eliminate the necessity of providing a separate tractor. However, it is considered preferable to form the vehicles as trailers.

As seen most clearly in FIGS. 2a and 3a, the portion 40 of the timber mill is supported by conventional wheels 46 for movement along highways as well as rougher terrain. Portion 40 of the timber mill is adapted to support an in-feed conveyor means which receives logs from the debarker mechanism or other suitable loading means and transports the logs to a positioning feed means as hereinafter described.

The portion 40 of the timber mill includes a support platform 48, and a pair of members 50 and 52 extend vertically upward from this platform and the upper ends of members 50 and 52 are adapted to rotatably journal a shaft 60 having a pair of spaced sprockets 62 fixed thereon. These drive sprockets are adapted to mesh with parallel chain members 64 and 66, these chain members being of endless construction and entrained around the drive sprockets 62.

Another sprocket 70 is secured to the outer end of shaft 60 and meshes with a drive chain 72 which is further in mesh with a drive sprocket 74 secured to the drive shaft of electric motor 78. This motor is connected by cable mechanism 80 with a suitable source of electrical energy such as a portable motor generator or the like (not shown).

The chain members 64 and 66 have rigid members 84 extending therebetween and securely attached thereto as by welding or the like. These crossmembers 84 may in a typical example comprise sections of railway track so as to be sufficiently strong and rugged as to support logs thereon and to stand up during long periods of use.

Disposed adjacent the left-hand end of the portion 40 of the timber mill are a pair of hydraulic cylinders 90 pivotally supported at the lower ends thereof on pivot pins 92. The piston rods 94 of the hydraulic cylinders have enlarged portions 96 supported at the outer ends thereof which rotatably support a shaft 100. A pair of idler sprockets 102 are supported on shaft 100, these idler sprockets being in meshing engagement with the chain members 64 and 66 which are trained thereover.

The hydraulic cylinders 90 may be remotely controlled as hereinafter described so as to raise or lower the shaft 100, thereby adjusting the slope or inclination of the in-feed conveyor means supported on portion 40 of the timber mill. This adjustment enables the in-feed conveyor means to accommodate various means for placing the logs onto the in-feed conveyor means and also aids in positioning the logs to be cut off.

The vehicle portion 42 of the timber mill is provided with supporting ground engaging wheels 110, and a hitch mechanism 114 is provided for interconnecting the two trailer portions 40 and 42 with one another. Any suitable means such as hitches 116 and 118 may be provided at the ends of the trailer portions 40 and 42 respectively for suitably interconnecting these trailer portions to a tractor and the like.

A positioning feed means is supported by trailer portion 42 and includes a plurality of aligned weight-supporting rolls 120, 122, 124, 126, 128, 130, 132, 134, 136 and 138, these rolls being of generally hourglass shape as seen in FIGS. 3a and 3b, the rolls being aligned with one another in the direction of movement of a log through the mill. Some of these rolls are driven and some are idlers as hereinafter described. A log moves lengthwise along these rolls during operation of the apparatus, and a stop plate indicated by reference numeral 140 is provided at the right-hand end of the mill as seen in these figures. The plate 140 is pivotally supported on a shaft 142, this shaft being supported by the upper ends of vertically extending members 144 supported by the platform portion 145. A pair of depending rods 146 are pivotally secured at 147 to the plate 140, these rods being received within hollow cylindrical portions 148 extending upwardly from the support platform 145. Rods 146 are provided with holes therein, and cylindrical members 148 are provided with a plurality of vertical holes formed therethrough for receiving pin means 150 when the holes in rods 146 are aligned with the holes 149 in members 148 for securing the stop plate 140 in desired inclined position so as to engage a log moving along the positioning feed means and to stop movement thereof.

Roll 120 is secured to a shaft 160, this shaft 160 being journalled within the upper ends of vertically extending members 162 the lower ends of which are supported by the platform 145. A drive pulley 164 is secured to the outer end of shaft 160 for driving the roll 120 in the manner hereinafter described.

A suitable drive motor 170 is supported on the platform 145, and an elongated drive shaft 172 extends therefrom. This shaft is rotatably journalled by spaced bearing portions 174 secured to the platform. A plurality of spaced drive pulleys 176, 178, 180, 182, 184 and 186 are secured to spaced portions of shaft 172, each of these drive pulleys being drivingly interconnected with the drive pulley of one of the aforementioned rolls for rotating the rolls when drive shaft 172 is rotated.

The drive pulley 176 is connected with a belt member 190 which is trained over drive pulley 176 as well as drive pulley 164 previously described. Accordingly, a twisted belt drive is provided between the drive shaft and roll 120. This type of drive is illustrated solely for the purpose of illustration, and it should be understood that any suitable drive means may be provided for selectively driving the rolls, and a chain drive may also be employed for this purpose.

The roll 122 is secured to a shaft 200 the opposite ends of which are rotatably supported by vertically extending spaced members 202. These members are supported at the lower ends thereof by coil compression springs 204. Members 202 are guided for vertical movement by guide members 206 secured to the platform.

A drive pulley 210 is fixed to the outer end of shaft 200, this drive pulley being drivingly connected with the pulley 178 by a twisted belt 212.

The roll 124 is secured to a shaft 220 which is rotatably supported by generally parallel spaced members 222. Members 222 are supported at the lower ends thereof by coil compression springs 224. Members 222 are guided in their vertical movement by guide members 226.

A drive pulley 230 is secured to the outer end of shaft 220, and drive pulley 230 is drivingly connected with pulley 180 by a twisted belt 232.

The guide members 206 and 226 are rigidly interconnected with one another by cross brace members 236. The vertically extending members 202 and 222 at either side of the rolls are interconnected with one another by upper links 238 and lower links 240 having the opposite ends thereof pivotally interconnected with the adjacent vertically movable members. It is apparent that rolls 122 and 124 are resiliently supported in the position illustrated and are adapted to move downwardly as required to accommodate logs supported thereon, such downward movement being guided to retain the members in proper relative position.

Roll 126 is secured to a shaft 250, this shaft being rotatably journalled by spaced vertical members 252. These vertical members are supported at the lower ends thereof by coil springs 254 resting on the platform. Vertical movement of member 252 is guided by guide portion 256 secured to the platform.

A drive pulley 260 is secured to the outer end of shaft 250, pulley 260 being drivingly interconnected with the pulley 182 by a twisted belt 262.

Roll 128 is secured to a shaft 270, the opposite ends of which are rotatably journalled by vertical members 272. These members 272 are supported at the lower ends thereof by coil springs 274 resting on the platform. Members 272 are guided for vertical movement by guide members 276 secured to the platform.

A drive pulley 280 is secured to the outer end of shaft 270, pulley 280 being drivingly connected with pulley 184 by a twisted belt 282.

Guide members 256 and 276 are rigidly interconnected with one another by cross brace members 286. Upper pivoted links 282 and lower pivoted links 290 are connected between the vertical members 252 and 272 at opposite sides of the rolls for pivotally interconnecting these vertically movable members. Here again, the rolls are resiliently supported and guided for vertical movement.

Roll 130 is secured to the shaft 300 the opposite ends of which are supported by a pair of spaced vertical members 302. These vertical members 302 are guided in their vertical movement by guide members 304 secured to the platform. The lower ends of vertically movable members 302 are supported by coil compression springs 306.

A drive pulley 310 is secured to the outer end of shaft 300, drive pulley 310 being drivingly interconnected with pulley 186 by twisted belt 312.

It is apparent from the foregoing that each of the rolls 120, 122, 124, 126, 128 and 130 are driven by the drive motor 170, and accordingly, this represents the drive portion of the positioning feed means. The remaining rolls 132, 134, 136 and 138 are all idler rolls and constitute the idler portion of the positioning feed means.

The roll 132 is secured to a shaft 320 the opposite ends of which are rotatably journalled within spaced vertical members 322 guided for movement by members 334. A coil spring 326 is disposed beneath the lower ends of vertical members 322 for resiliently supporting these vertical members.

Roll 134 is secured to the shaft 330 the opposite ends of which are rotatably journalled within spaced generally parallel vertical members 332. Members 332 are supported by coil compression springs 334 supported by the platform. Members 332 are guided in vertical movement by guide members 336 secured to the platform.

Roll 136 is secured to a shaft 340 the opposite ends of which are rotatably journalled within spaced generally parallel vertical members 342. The lower ends of members 342 are supported by coil springs 344 which rest upon the platform. Vertical movement of members 342 is guided by guide members 346 secured to the platform.

Guide members 336 and 346 are rigidly interconnected with one another by cross brace members 350. An upper link 352 and a lower link 354 each have their opposite ends pivotally interconnected with the vertical members 332 and 342 at opposite sides of the rolls, whereby the rolls are resiliently supported for vertical movement and are guided in such movement.

Roll 138 is secured to a shaft 360 the opposite ends of which are rotatably journalled within spaced vertical members 362. Vertical members 362 are guided in their vertical movement by guide members 364 secured to the platform. Coil compression springs 366 engage the lower ends of vertical members 362, these coil springs resting upon the platform.

Referring now to FIGS. 2a, 3a and 4, the details of construction at the sawing or cutting station are most clearly illustrated. A conventional chain saw driving mechanism is indicated generally by reference numeral 360, this mechanism being supported by a pair of spaced support members 362 secured to the platform 145. A chain support means 364 of conventional construction supports a cutting chain 366 having the usual cutting members thereon, and being driven in the usual manner. Portion 364 is pivotally supported for movement about an axis 368.

Power-operated means are provided for pivoting the chain saw into cutting position with respect to a log and includes a hydraulic cylinder 370 supported upon a bracket 372 secured to one of the vertical support members 362. The piston rod 374 of the cylinder is connected with a bifurcated portion 376 which is in turn pivotally interconnected at 378 to opposite sides of the portion 364 of the chain saw. It is apparent that operation of the hydraulic cylinder will cause the chain saw to be pivoted into the desired operative position either as in a non-cutting relationship as shown in FIG. 4, or in the cutting position shown in FIG. 5.

A pair of log lifting members 380 and 382 are suitably pivotally supported at one end thereof, and as seen most clearly in FIG. 4, member 382 is pivotally connected with the upper end of a vertical member 384 by a pin means 386.

Hydraulic means is provided for raising and lowering the log lifting members, and a first hydraulic cylinder 390 is pivotally supported at the lower end thereof about a pivot pin 392. The piston rod 394 of this cylinder is pivotally connected by a pin means 396 with the outer end of log lifting member 380.

A further hydraulic cylinder 400 is pivotally supported at the lower end thereof by pivot pin 402. The piston rod 404 of this cylinder is pivotally interconnected by a pin 406 with the outer end of log lifting member 382.

It is apparent that operation of the hydraulic cylinders 390 and 400 are adapted to selectively raise or lower the log lifting members for a purpose hereinafter described.

As seen most clearly in FIG. 4, a log hold-down means is indicated generally by reference numeral 410 and includes a depending lug 412 which is pivotally secured by a pin 414 to a bracket 416 secured to the upper surface of the chain saw drive mechanism 360.

The hold-down means includes a first elongated portion 418 which joins with a generally normally extending portion 420, portion 420 in turn joining with a normally extending portion 422 which extends substantially parallel with the portion 418. A pair of spaced guide portions 426 are secured to the upper surface of the chain saw driving mechanism 360, these guide portions guiding vertical movement of portion 418 of the hold-down means.

Power operated means is provided for controlling the operation of the hold-down means and includes a hydraulic cylinder 430 pivotally supported at the lower end thereof by a pivot pin 432. The piston rod 434 of the cylinder is pivotally connected by pin 436 with the portion 418 of the hold-down means. It is apparent that operation of hydraulic cylinder 430 is adapted to swing the hold-down means about the pivot pin 414 for a purpose hereinafter described.

A pair of side thrust members 440 and 442 are provided, each of these side thrust members being pivotally supported at the lower ends thereof for lateral movement. The construction and operation of these two side thrust members is substantially identical, and the details of construction and operation of the side thrust member 442 may be clearly seen in FIG. 4, it being understood that the side thrust member 440 is provided with similar components as illustrated in connection with side thrust member 442.

Side thrust member 442 is pivotally supported at the lower end thereof by a pivot pin 444. Hydraulic means is provided for pivoting member 442 about pivot pin 444 and includes a hydraulic cylinder 450. One end of the cylinder is pivotally connected by a pin 452 with a bracket 454 secured to a vertically extending member 456 supported by the platform. The piston rod 458 of the hydraulic cylinder is pivotally connected at 460 to the side thrust member 442. It is apparent that operation of the hydraulic cylinder 450 will cause the side thrust member 442 to pivot in a lateral direction with respect to the apparatus for a purpose hereinafter described.

A first generally horizontally extending guide member 470 is supported by a pair of vertically extending members 472, and a second generally horizontally extending guide member 480 is supported by a pair of spaced vertically extending members 482. These guide members 470 and 480 are adapted to guide movement of the lateral thrust members 440 and 442 respectively in a lateral direction, the log lifting members 380 and 382 serving as guide means on the opposite side of these lateral thrust members.

As seen most clearly in FIG. 3b, a first pair of movable log engaging unloading means are indicated generally by reference numerals 500 and 502, these unloading means being pivotally supported by a support means 504 secured to the platform. A further pair of log unloading means 506 and 508 are pivotally supported by a support means 510. Still another log unloading means 514 is pivotally supported by a support means 516.

Each of these log unloading means is of substantially identical construction, and accordingly, the details of construction of the log unloading means 500 will be specifically described, the corresponding members of the other log unloading means being given the same reference numerals primed for the sake of simplicity.

Figure 6:
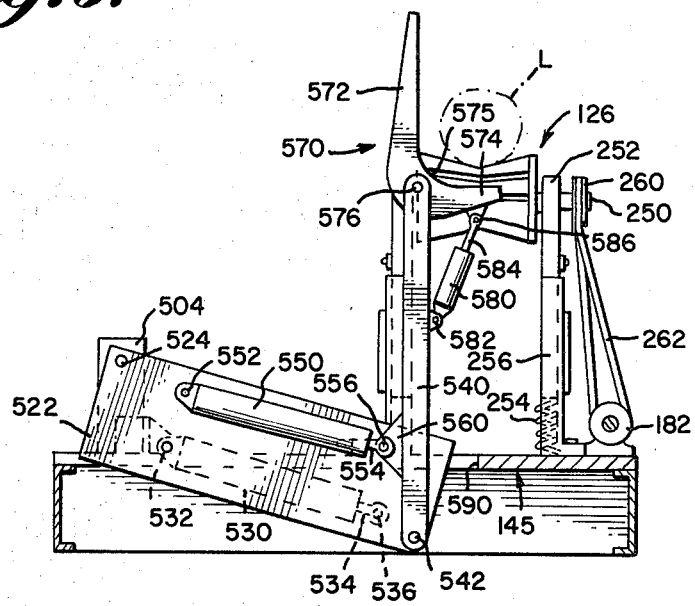
FIG. 6 is a sectional view taken substantially along line 6—6 of FIG. 3b looking in the direction of the arrows.

As seen in FIGS. 3b and 6, the log unloading means 500 includes a pair of spaced plates 520 and 522 which are pivotally supported on a pivot pin 524 secured to the support means 504.

A first hydraulic cylinder 530 is pivotally supported at 532 to the support means 504. The piston rod 534 of the cylinder is connected with a pin 536 which in turn is secured to plate 522. It is apparent that operation of hydraulic cylinder 530 will cause plates 520 and 522 to pivot about the axis of pivot pin 524.

An elongated arm 540 is pivotally supported on a shaft 542 which extends between plates 520 and 522, this shaft serving to interconnect the plates for movement with one another.

Another hydraulic cylinder 550 is provided, this hydraulic cylinder being pivotally supported upon a shaft 552 which extends between plates 520 and 522. The piston rod 554 of the cylinder is pivotally connected at 556 with a bracket 560 extending from the elongated arm 540. It is apparent that operation of hydraulic cylinder 550 will cause the elongated arm 540 to pivot about the shaft 542.

A cradle member 570 includes a first elongated portion 572 and a second elongated portion 574 extending generally normally from the portion 572, these portions defining an inner curved surface therebetween as indicated by reference numeral 575 for supporting a log between the two portions 572 and 574. The cradle member is pivotally supported by a pin 576 extending between the outer bifurcated end portion of elongated arm 540.

A hydraulic cylinder 580 is pivotally interconnected by pin 582 with the arm 540. The piston rod 584 of the cylinder is pivotally connected by pivot pin 586 with the cradle member. It is apparent that operation of hydraulic cylinder 580 is adapted to cause the cradle member to pivot with respect to the outer end of elongated arm 540.

Figure 7:
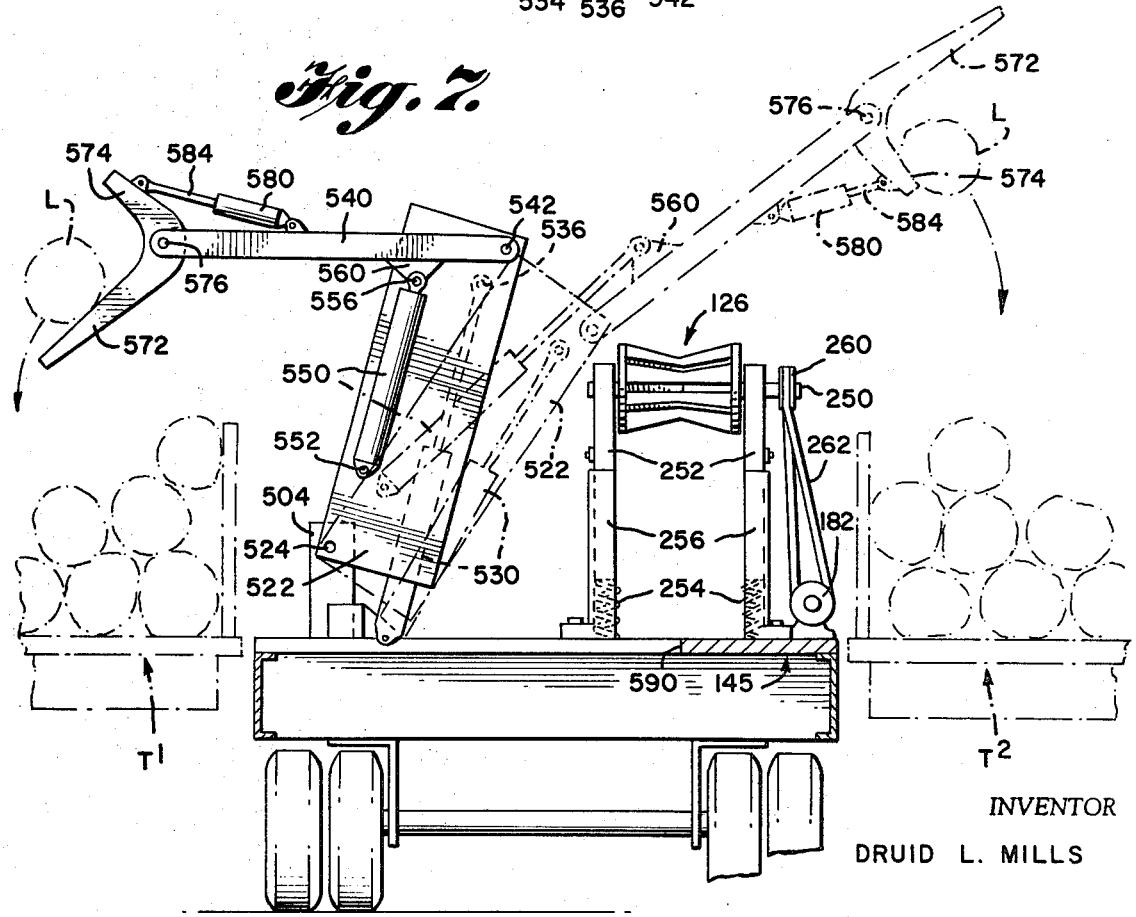
FIG. 7 is a view similar to FIG. 6 illustrating further details of construction of the apparatus and showing different operative unloading positions of the unloading members.

Referring now to FIG. 7, the manner in which the log unloading means operates to unload a log from the rolls is illustrated. Referring again to FIG. 6, the log unloading means is disposed in its normal inoperative position wherein it is disposed adjacent a roll with the portion 574 thereof disposed below the roll so as to not engage or interfere with movement of a log along the rolls.

Referring again to FIG. 7, the full line position illustrates the manner in which a log may be lifted off of the rolls and then maneuvered so as to be unloaded onto a first truck indicated by phantom line $T^1$. In this position, it will be noted that the plates 520 and 522 have been pivoted into a nearly upright position while the elongated arm 540 remains in substantially the same position relative to the plates. The cradle member 570 will of course be manuevered as the plates and arm move so as to retain a log in place therein. In the position shown in FIG. 7, the cradle has been pivoted sufficiently so that the log will roll downwardly therealong so as to drop under the influence of gravity onto the truck.

FIG. 7 also illustrates in phantom lines the position occupied by the log unloading components for unloading a log into a truck indicated by phantom line $T^2$ disposed at the opposite side of the timber mill.

In the position shown in FIG. 7, the plates have not been pivoted upwardly as much as they have in FIG. 6, and the elongated arm 540 has been swung outwardly a maximum distance possible with the hydraulic cylinder 550. The cradle member as shown in FIG. 7 is positioned so that a log will drop therefrom under the influence of gravity onto a truck $T^2$.

It is apparent that the construction as illustrated in FIGS. 6 and 7 enables the cradle member to be effectively maneuvered so as to move a log upwardly from the positioning feed means rolls and to either side of the apparatus for discharge therefrom.

Referring again to FIG. 6, it will be noted that the platform is provided with a suitable slot means 590 to enable the plates of the log unloading means to move into the normal inoperative position as seen in this figure.

As seen most clearly in FIGS. 2b and 3b, a plurality of spaced microswitch mechanisms 600, 602, 604, 606, 608, 610, 612, 614, and 616 are supported by support members 620, 622, 624, 626, 628, 630, 632, 634 and 636 respectively which extend upwardly from the platform. The microswitches include elongated flexible sensing elements 600', 602', 604', 606', 608', 610', 612', 614' and 616' respectively which extend upwardly above the support surfaces of the adjacent rolls so that logs moving along the rolls will engage the sensing elements of the microswitches. These microswitches are employed for accurately measuring the cut length of the logs as hereinafter described.

As seen most clearly in FIG. 1, a sawyer's platform 640 is supported at one side of the portion 42 of the timber mill, this platform being so positioned that a sawyer can readily observe logs moving along the infeed conveyor means and onto the positioning feed means whereby he may effectively determine what length of log is to be cut. A control panel indicated by reference numeral 642 is disposed at the sawyer's station.

An unloader's station 646 is supported at the end of portion 42 of the timber mill in such a position that the unloader can observe logs supported by the rolls of the positioning feed means, and further so that he can look down on trucks being loaded at either side of the mill. A control panel 648 is disposed adjacent platform 646 to be operated by the unloader.

Accordingly, as seen in FIG. 1, the apparatus of the present invention can be effectively operated by three men. A first man is required to operate the loading mechanism for placing a log onto the debarker means. A sawyer is positioned on platform 640, and an unloader is positioned on platform 646.

Referring now to FIG. 8 of the drawings, the remote control system for actuating the various components of the timber mill are schematically illustrated. The various hydraulic cylinders, drive motors and microswitches previously described are provided with the same reference numerals in this figure.

The sawyer's control panel includes a plurality of selectively operable four-way valves 700, 702, 704, 706, 708, 710 and 712, all of which are connected in parallel with one another and in series with a hydraulic pump 716 and a conventional sump 718.

Valve 700 is connected by suitable conduits 90' with the hydraulic cylinder 90 which controls the inclination of the in-feed conveyor means.

Valves 702 and 712 are connected by suitable conduits 450' with the two hydraulic cylinders 450 for independently controlling the operation of the two side thrust members.

The valves 704 and 710 are connected by suitable conduits 390' and 400' respectively with the hydraulic cylinders 390 and 400 whereby the log lifting members can be independently operated.

The valve 306 is connected by conduits 430' with the hydraulic cylinder 430 for controlling the operation of the hold-down means. Valve 708 is connected by conduits 376' with the hydraulic cylinder 376 for controlling the pivotal movement of the chain saw.

It is apparent that suitable operation of the valves 702–712 inclusive enables the clamping means including the log lifting members, the log hold-down member and the side thrust members to be actuated as hereinafter described for effectively controlling the cutting of a log.

The sawyer's panel also includes a first electrically operable switch 730. One side of the switch is connected by lead 732 with a motor generator indicated by reference numeral 734, this motor generator being located at any suitable position adjacent to the timber mill. The other side of the motor generator is connected by a lead 736 with the drive means 360 of the chain saw. The opposite side of switch 730 is connected by lead 738 with the drive means of the chain saw. It is apparent that switch 730 is adapted to control the operation of the chain saw.

A switch 740 has one side thereof connected with the lead 732 previously described. The other side of switch 740 is connected by lead 742 with the motor 78 which operates the in-feed conveyor means. The other side of motor 78 is connected with the lead 736 previously described. It is apparent that manually operable switch 740 is adapted to control the drive of the in-feed conveyor means whereby this in-feed conveyor means may be started and stopped at will.

A plurality of switches 750, 752, 754, 756, 758, 760, 762, 764 and 766 are connected by leads 750', 752', 754', 756', 758', 760', 762', 764' and 766' respectively with microswitches 600, 602, 604, 606, 608, 610, 612, 614 and 616. The opposite sides of each of these microswitches are connected with a lead 770 which is connected with one side of the motor 170. The other side of the motor is connected by a lead 772 with the motor generator 734 previously described.

A further switch 768 is connected by lead 774 with the lead 770. All of the aforementioned switches 750–768 inclusive are connected at the opposite sides thereof with the lead 732 previously described.

Each of the microswitches 600–616 inclusive are normally closed, while each of the switches 750–768 inclusive are normally open. By closing any one of the switches 750–766 inclusive, a circuit is closed through one of the microswitches so as to actuate the motor 170 to drive the drive rolls previously described. These microswitches are positioned at points along the mill so that the microswitches 600, 602, 604, 606, 608, 610, 612, 614 and 616 are adapted to be engaged by the front end of a log and to stop the log at such points when it is desired to cut a log to lengths of 4 ft., 5 ft., 6 ft., 8 ft., 10 ft., 12 ft., 14 ft., 16 ft. and 18 ft. respectively.

Accordingly, if it desired, for example, to cut a 4-foot length of log, switch 750 is closed thereby energizing a circuit through microswitch 600 causing motor 170 to operate the drive rolls until the forward end of the log strikes the microswitch 600. When the log hits this microswitch, it is adapted to open the microswitch thereby opening the circuit so as to stop motor 170. The log is then accurately positioned for cutting by the saw which is so positioned when the log is stopped at this location that it will cut off a length of log 4 ft. long. It will be understood that any one of the microswitch circuits can be selected in accordance with the desired length of log to be cut, whereupon after one of the switches 750–766 is closed, the log will be advanced until it reaches the proper position and then will be automatically stopped. The switch 768 enables the sawyer to operate the drive rolls independently of the microswitches.

The unloader's panel includes a plurality of valves for remotely controlling the various log unloading means previously described. A first set of valves 800, 802 and 804 are provided for controlling log unloading means 500. Valves 800, 802 and 804 are each four-way valves and are connected in parallel with one another and in series with a conventional hydraulic pump 808 and an associated sump 806.

Valve 800 is connected by suitable conduits 820 with the hydraulic cylinder 580 for controlling the pivotal movement of the cradle of log unloading means 500. Valve 802 is connected by suitable conduits 822 with the hydraulic cylinder 530 for controlling the pivotal movement of the plates of this log unloading means. The valve 804 is in turn connected by conduits 824 with the hydraulic cylinder 550 for controlling the pivotal movement of the elongated arm of this log unloading means.

It is evident that by suitably actuating the valves 800, 802 and 804, the log unloading means 500 may be selectively operated.

Each of the remaining log unloading means is provided with three control valves substantially identical with those previously described, and accordingly the remaining valves of the unloader's panel have been given the same reference numerals primed, it being understood that these valves operate in the same manner with respect to the associated log unloading means so as to selectively move the log unloading means when desired.

OPERATION

A log is initially handled by means of the grapple 12 of vehicle 10 to place it on the debarker 30. The log is moved along the debarker and over the metal detector 32 onto the in-feed conveyor means mounted on the portion 40 of the timber mill.

The sawyer controls the inclination of the in-feed conveyor means by operating valve 700, and he can start and stop the in-feed conveyor means as required by operation of the switch 740.

The sawyer scrutinizes the tree as it moves along the in-feed conveyor means and decides the length of log he wants to cut, or whether he wants to cut veneer or pulpwood. Let us assume that he decides to cut a 12-foot log. In this case, he would operate switch 760 thereby closing the circuit through microswitch 612 to cause motor 170 which is initially de-energized, to be energized. The rolls 120, 122, 124, 126, 128, and 130 are then driven so as to advance the log toward the right-hand side of the drawings. The log will continue to advance until it engages the sensing means of microswitch 610 whereupon the microswitch which is normally closed is opened so as to de-energize motor 170. The log is then properly positioned for cutting a 12-foot length.

Figure 5:
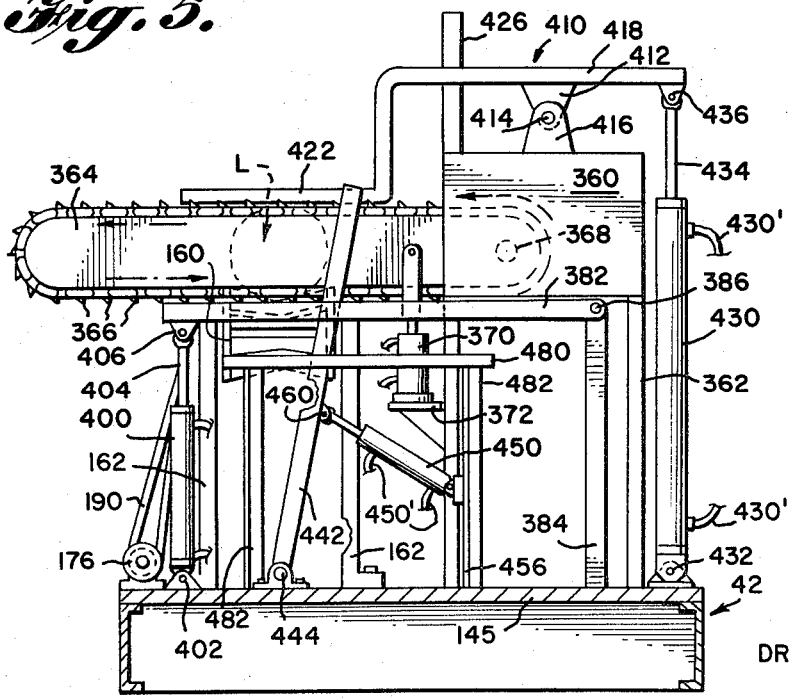
FIG. 5 is a view similar to FIG. 4 illustrating the components in a different operative position.

The sawyer then operates valves 704 and 710 to move the log lifting members upwardly so as to lift the logs into the operative position shown in FIG. 5 wherein the log is supported by the log lifting members above the underlying positioning feed means rolls.

The sawyer also operates valve 706 so as to move the log hold-down means 410 downwardly into the operative position shown in FIG. 5. The sawyer also operates valves 702 and 712 so as to move the side thrust members 440 and 442 into the operative position shown in FIG. 5 so that they are adapted to abut against the side of the log and to prevent lateral movement of the log toward the right-hand side of this figure which would be the normal tendency when the chain saw is operated in a counterclockwise direction as indicated by the arrows in this figure.

The log is then securely clamped in position by the log lifting members, the log hold-down member and the side thrust member.

The sawyer then operates switch 730 to drive the chain saw, and valve 708 is operated so as to swing the saw downwardly to cut the log. The chain saw is then moved further downwardly so as to completely sever the log, the hold-down means preventing the portion of the log to the left of the saw as seen in FIG. 2a, for example, from flying up in the air.

After the log has been cut, the log lifting members, the log hold-down member and the side thrust members are moved back into their initial position as shown in FIG. 4, whereupon the log is free to advance along the positioning feed rolls. The sawyer may then operate switch 768 so as to move the log along the rolls until it strikes the stop plate 140.

The sawyer can then repeat this cycle of operation, it being understood that by suitably controlling the drive to the in-feed conveyor means and the drive rolls, logs may be sequentially fed through the timber mill. The loading operator determines on which truck a log should be placed and operates the control valves of the unloading panel so as to operate suitable log unloading means to lift the log upwardly from the rolls and then transfer the log over the side of the timber mill onto an adjacent truck.

Various ones of the log unloading means 500, 502, 506, 508 and 514 may be selectively operated according to the length of the log which has been cut. Generally speaking, it is only necessary to operate two spaced log unloading means for lifting a log, although all of these unloading means may be operated simultaneously if desired. It should also be noted that a log does not necessarily have to be moved all the way into engagement with the stop plate 140, but in the case of shorter length cuts, the cut portion may not be moved all the way into engagement with the stop plate.

It is evident that the remote control system as shown in FIG. 8 enables a sawyer to selectively decide what length of log is to be cut, and then by closing a suitable switch, this length log is automatically measured and determined by the apparatus, whereupon the saw is adapted to cut off the predetermined length. The entire cutting and unloading operation can be carried out by a sawyer and an unloader, and these operations may be very efficiently and quickly accomplished with the control system of the present invention.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A timber mill comprising conveyor feed means for feeding a log through the mill, cutting means for cutting the log, means adjustably supporting said conveyor means so that the inclination thereof can be varied as desired to position the log such that the longitudinal axis thereof is perpendicular to the plane of a cut made by said cutting means thereby ensuring a substantially square cut through the log, unloading means for unloading cut logs from the mill, and a plurality of automatic remote control measuring and sensing means for accurately and automatically measuring a log and stopping the feed means at different positions to rapidly position and cut logs to different predetermined lengths.

2. A timber mill comprising feed means for feeding a log through the mill, cutting means for cutting the log, unloading means for unloading cut logs from the mill, means for clamping the log in position to be cut, said clamping means including side thrust means for engaging the side of a log to prevent lateral movement thereof, said side thrust means including a pivotally mounted member, power-operated means connected with said pivotally mounted member, and remote control means connected with said power operated means for remotely controlling the operation thereof, and a plurality of automatic remote control measuring and sensing means for accurately and automatically measuring a log and stopping the feed means at different positions to rapidly position and cut logs to different predetermined lengths.

3. Apparatus as defined in claim 2, wherein the feed means comprises conveyor means, means adjustably supporting said conveyor means so that the inclination thereof can be varied as desired to position the log such that the longitudinal axis thereof is perpendicular to the plane of a cut made by said cutting means thereby ensuring a substantially square cut through the log.

4. Apparatus as defined in claim 3, wherein said in-feed conveyor means is of the endless conveyor type.

5. Apparatus as defined in claim 1, including means for clamping the log in position to be cut, said clamping means including side thrust means for engaging the side of a log to prevent lateral movement thereof, said side thrust means including a pivotally mounted member, power-operated means connected with said pivotally mounted member, and remote control means connected with said power operated means for remotely controlling the operation thereof.

6. Apparatus as defined in claim 2, wherein said clamping means includes movably mounted log hold down means, movably mounted log lifting means, and remote control means for remotely controlling the operation of each of said lifting means, hold down means and side thrust means.

7. Apparatus as defined in claim 1, wherein said feed means includes a plurality of weight supporting rollers which are resiliently mounted.

8. Apparatus as defined in claim 1, wherein said unloading means includes a plurality of unloading arms, and each of said unloading arms including a plurality of pivotally mounted lever means.

9. Apparatus as defined in claim 8, wherein the lever means includes means for manuevering cut logs into position on either side of the mill for loading cut logs onto trucks or the like in a neat and orderly fashion.

10. Apparatus as defined in claim 9, wherein the unloading means is manueverable both vertically and horizontally.

11. Apparatus as defined in claim 8, wherein the unloading arms are operatively connected to means for manuevering the arms in pairs so that one arm contacts near one end of the log, while the other arm contacts near the other end of the log, and both arms are moved in unison, thereby holding the log in a stable position while manuevering said log to its desired position on a truck or in a storage space.

12. Apparatus as defined in claim 1, wherein said feed means includes a plurality of feed rolls aligned one with another, means for driving said rolls, clamping means for clamping a log in position adjacent said cutting means, said clamping means including movably mounted log lifting means, movably mounted log hold down means and movably mounted side thrust means, said unloading means including a plurality of spaced movable log engaging portions, and remote control means for remotely controlling the operation of said feed rolls, said clamping means and said unloading means.

13. A timber mill as in claim 1, wherein said measuring and sensing means comprising a plurality of spaced sensing devices disposed in the path of a log moving through the mill, said sensing devices connected through a control circuit with a drive means for driving said feed means, said control circuit selectively operable to activate one of said sensing devices so that when said one sensing device senses a log, the feed mean is stopped and the log is automatically measured and positioned to be cut to different lengths, depending on which sensing device is selectively activated.

14. Apparatus as defined in claim 1, wherein said feed means includes a plurality of rotatable rolls for supporting and moving a log therealong, means for driving said rolls, said measuring and sensing means including means for controlling the drive to said rolls to interrupt the drive to the rolls.

15. Apparatus as defined in claim 1, wherein said measuring and sensing means includes sensing means disposed in the path of movement of a log through the mill to be engaged thereby, said sensing means being connected in a remote control drive system interconnected with a portion of said feed means.

16. Apparatus as defined in claim 1, including means for clamping a log in position to be cut, and remote control means for operating said clamping means.

17. Apparatus as defined in claim 16, wherein said clamping means includes lifting means for engaging the underside of a log to lift it in a vertical direction.

18. Apparatus as defined in claim 17, wherein said lifting means includes at least one pivotally mounted lifting member, and power-operated means connected with said lifting member, remote control means being connected with said power-operated means to remotely control the movement of said lifting member.

19. Apparatus as defined in claim 16, wherein said clamping means includes log hold down means for holding a log against upward movement when cut by a saw.

20. Apparatus as defined in claim 19, wherein said hold down means includes a pivotally mounted member, power-operated means operatively connected with said member, and remote control means for controlling the operation of said power-operated means.

21. Apparatus as defined in claim 16, including side thrust means for engaging the side of a log to prevent lateral movement thereof toward said cutting means.

22. Apparatus as defined in claim 1, wherein said cutting means includes a saw means, said saw means being movably mounted, and remotely controlled power-operated means for moving said saw means into operative position.

23. Apparatus as defined in claim 1, wherein said feed means includes positioning feed means comprising a plurality of weight-supporting rolls, means for driving said rolls, said rolls being substantially aligned with one another, at least one of said rolls being disposed at either side of said cutting means in the direction of movement of a log through the mill.

24. Apparatus as defined in claim 23, wherein at least some of said rolls are resiliently supported.

25. Apparatus as defined in claim 23, including stop means disposed in alignment with said rolls and in the path of movement of a log through the mill for positively limiting the movement of a log.

26. Apparatus as defined in claim 1 wherein said feed means includes a positioning feed means, said in-feed conveyor means and said positioning feed means being substantially aligned with one another, said positioning feed means including a plurality of rolls, and means for driving said rolls.

27. Apparatus as defined in claim 26, wherein said in-feed conveyor means is of the endless conveyor type.

28. Apparatus as defined in claim 26, wherein said in-feed conveyor means is adjustably supported so that the inclination thereof can be varied as desired to compensate for logs of different taper so that the end of said log can be cut square.

29. Apparatus as defined in claim 1, wherein said unloading means includes a plurality of spaced movable log engaging portions.

30. Apparatus as defined in claim 29, wherein said log engaging portions are pivotally mounted and power-operated.

31. Apparatus as defined in claim 30, wherein said engaging portions are connected with a remote control system for selectively independently remotely controlling the operation of said log engaging portions.

32. Apparatus as defined in claim 29, wherein said feed means includes a plurality of aligned rolls, said log engaging portions being normally disposed adjacent said rolls and disposed below the upper supporting surfaces of said rolls.

33. A timber mill as in claim 1, wherein said measuring and feed stop means comprises a plurality of spaced microswitch means disposed in the path of a log moving through the mill, said microswitches connected through a control circuit with a drive means for driving said feed means, said control circuit selectively operable to activate one of said microswitches so that when said one microswitch is engaged by a log, the feed means is stopped and the log is automatically measured and positioned to be cut to different lengths, depending on which microswitch is selectively activated.

34. A timber mill as in claim 1, wherein said unloading means includes automatic remote control means for segregating various types of logs according to length, species and the like, and means for loading and positioning the segregated logs for transportation.

35. A timber mill comprising feed means for feeding a log through the mill, cutting means for cutting the log, unloading means for unloading cut logs from the mill, and a plurality of automatic remote control measuring and sensing means for accurately and automatically measuring a log and stopping the feed means at different positions to rapidly position and cut logs to different predetermined lengths, said measuring and feed stop means comprising a plurality of spaced microswitch means disposed in the path of a log moving through the mill, said microswitches connected through a control circuit with a drive means for driving said feed means, said control circuit selectively operable to activate one of said microswitches so that when said one microswitch is engaged by a log, the feed means is stopped and the log is automatically measured and positioned to be cut to different lengths, depending on which microswitch is selectively activated.

* * * * *